United States Patent
Choi et al.

(10) Patent No.: US 11,556,217 B2
(45) Date of Patent: Jan. 17, 2023

(54) DISPLAY DEVICE INCLUDING DEVICE FOR SUPPLYING SIGNAL TO PANEL DRIVING INTEGRATED CIRCUIT

(71) Applicant: SILICON WORKS CO., LTD., Daejeon (KR)

(72) Inventors: Jung Min Choi, Daejeon (KR); Jong Min Park, Daejeon (KR); Hee Yoon Jung, Daejeon (KR); Seong Sik Yoon, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 0 days.

(21) Appl. No.: 17/322,699

(22) Filed: May 17, 2021

(65) Prior Publication Data
US 2021/0365156 A1    Nov. 25, 2021

(30) Foreign Application Priority Data
May 21, 2020 (KR) .................. 10-2020-0060661

(51) Int. Cl.
*G06F 3/044*    (2006.01)
*G06F 1/18*    (2006.01)
*G06F 3/041*    (2006.01)

(52) U.S. Cl.
CPC .......... *G06F 3/0446* (2019.05); *G06F 1/189* (2013.01); *G06F 3/04164* (2019.05)

(58) Field of Classification Search
CPC ..... G06F 3/0446; G06F 3/04164; G06F 1/189
USPC ........................................... 345/156
See application file for complete search history.

(56) References Cited

U.S. PATENT DOCUMENTS

| | | | |
|---|---|---|---|
| 8,884,909 B2 | 11/2014 | Huang et al. | |
| 9,274,661 B2 | 3/2016 | Yeh | |
| 9,342,195 B2 | 5/2016 | Zhang | |
| 9,619,083 B1* | 4/2017 | Kang | G06F 3/0443 |
| 10,095,948 B2 | 10/2018 | Hargreaves et al. | |
| 10,976,857 B1* | 4/2021 | Chang | G06F 3/04184 |
| 2016/0328044 A1* | 11/2016 | Li | G06F 3/0443 |
| 2017/0102825 A1* | 4/2017 | Kim | G06F 3/041 |

FOREIGN PATENT DOCUMENTS

| | | | |
|---|---|---|---|
| KR | 10-2008-0030191 A | | 4/2008 |
| KR | 20180045355 A | * | 5/2018 |

* cited by examiner

*Primary Examiner* — Mark Edwards
(74) *Attorney, Agent, or Firm* — Fenwick & West LLP

(57) ABSTRACT

Disclosed is a technology that supplies a signal to a panel driving integrated circuit (IC). A plurality of signals having different characteristics are stably provided to a panel driving IC according to a display operation or a touch operation, by controlling capacitance connected to a transmission conduction wire.

14 Claims, 11 Drawing Sheets

DISPLAY DEVICE INCLUDING DEVICE FOR SUPPLYING SIGNAL TO PANEL DRIVING INTEGRATED CIRCUIT

CROSS REFERENCE TO RELATED APPLICATION

This application claims priority from Republic of Korea Patent Application No. 10-2020-0060661, filed on May 21, 2020, which is hereby incorporated by reference in its entirety.

BACKGROUND

1. Field of Technology

The present disclosure relates to a technology that stably supplies a signal for outputting image data or a signal for sensing a touch or proximity to a panel driving integrated circuit.

2. Description of the Prior Art

The screen of an electronic device may be an area in which an image is displayed and an area for receiving an input. A touch sensing technology that recognizes a touch or proximity of an external object may be used so that the screen of the electronic device receives an input. A touch panel inside the electronic device is disposed in a location that is the same as the location of a display panel on the plane. Accordingly, users may input a user manipulation signal to the touch panel while viewing an image on the display panel. A method of producing a user manipulation signal may provide amazing intuitiveness when compared to other existing user manipulation input schemes, for example, a mouse-based input scheme or a keyboard-based input scheme.

In the in-cell structure in which the display panel and the touch panel are disposed in the same location, a panel driving integrated circuit (IC), for example, a source driver IC, a source readout IC, and a gate driver IC, may drive each panel by transmitting a signal having a constant level over time or a signal having a level that varies over time, to the display panel and the touch panel. Here, the signal having a constant level over time may be provided in a direct current (DC) form, and the signal having a level that varies over time may have a period.

In the in-cell structure, a common electrode may be used as the display panel and the touch panel in parallel. If the common electrode is used as the display panel in order to display image data, the panel driving IC may transmit a direct current (DC) voltage to the common electrode. Conversely, if the common electrode is used as the touch panel in order to sense a touch or proximity of an external object, the panel driving IC may transmit a periodic voltage to the common electrode.

The panel driving IC may receive a DC voltage or a modulated voltage from the outside, and may supply the same to a panel. In order to stably provide a DC voltage needed for a display operation to the panel driving IC, a capacitor may need to be connected to a transmission conducting wire. As capacitance increases, the effect of noise on a DC voltage is further excluded, and thus, fluctuation of the DC voltage may be prevented. The noise may be produced due to a shoddy pattern of pixels or touch electrodes, or switching by a multiplexer.

In order to stably provide a modulated voltage needed for a touch operation to the panel driving IC, a capacitor may need to be excluded from a transmission conducting wire. As the capacitance is smaller, a modulated voltage quickly varies among a plurality of levels, and thus, a response speed of the modulated voltage becomes faster. Therefore, depending on whether the panel implements a display operation or a touch operation, the display device may need to transmit a DC voltage or a modulated voltage to the panel driving IC at an appropriate timing.

As described above, if a capacitance is extremely high or low in a conducting wire in which a DC voltage or a modulated voltage is supplied, neither the direct voltage nor the modulated voltage may be normally transmitted to the panel driving IC. If the capacitance is extremely high, the level of a signal that is transmitted along a conducting wire may be constantly maintained, which may be positive for a DC voltage but may be negative for a modulated voltage.

In association with the same, the embodiments of the present disclosure may provide a technology that stably supplies both a DC voltage and a modulated voltage to a panel driving IC to be appropriate for a display operation and a touch sensing operation.

SUMMARY OF THE INVENTION

In the background, an aspect of the present disclosure is to provide a technology that connects a capacitive element that provides capacitance to a transmission conducting wire or removes the capacitive element from the transmission conducting wire, so as to transmit a direct current (DC) voltage or a modulated voltage to a panel driving integrated circuit (IC).

Another aspect of the present disclosure is to provide a technology that receives a driving voltage from a power management integrated circuit (IC), and produces and supplies a DC voltage or modulated voltage according to a display operation or a touch operation.

Another aspect of the embodiments is to provide a technology associated with a signal stabilization circuit including a capacitive element and a switching circuit that controls connection and disconnection of the capacitive element.

In accordance with an aspect of the present disclosure, there is provided a display device, comprising: a modulation integrated circuit (IC) configured to output a direct current (DC) voltage or a modulated voltage having a plurality of levels; and a capacitive element configured to be connected to an output end of the modulation IC when the DC voltage is output from the modulation IC, and configured to be disconnected from the output end of the modulation IC when the modulated voltage is output from the modulation IC.

The display device may further comprise a switching circuit disposed between the output end of the modulation IC and the capacitive element.

A control signal for the switching circuit may be received from a timing controller that outputs image data to a panel, or from a microcontroller that senses a touch or proximity of an external object to the panel.

The switching circuit may be configured to connect the capacitive element to the output end of the modulation IC in a first interval in which image data is output, and may be configured to disconnect the capacitive element from the output end of the modulation IC in a second interval in which a touch or proximity of an external object is sensed.

The DC voltage may be supplied to a common electrode in order to output image data, and the modulated voltage may be supplied to the common electrode in order to sense a touch or proximity of an external object.

The common electrode may comprise a first common electrode for receiving the modulated voltage, and a second common electrode for receiving the modulated voltage and transmitting a response signal including information associated with sensing of the touch or proximity of the external object, and the modulated voltage may be supplied as a zero load driving voltage to the first common electrode.

The modulated voltage may be supplied to a gate line via a gate driving integrated circuit (IC) which scans a pixel in order to output image data.

The common electrode may be connected to an integrator which senses a change in capacitance of the common electrode, and the modulated voltage may be supplied to the common electrode via the integrator.

The common electrode may be connected to an integrator which senses a change in capacitance of the common electrode, and the DC voltage may be supplied to the common electrode by bypassing the integrator.

The display device may further comprise a panel driving integrated circuit (IC) configured to drive a panel, and the panel driving IC may be configured to operate according to a time-division signal associated with a display interval in which image data is output to the panel and a touch interval in which a touch or proximity of an external object to the panel is sensed, and the modulation IC may be configured to supply the DC voltage to the panel driving IC in the display interval and to supply the modulated voltage to the panel driving IC in the touch interval, according to the time-division signal.

The panel driving IC may further comprise a switching circuit disposed between the output end of the modulation IC and the capacitive element.

The panel driving IC may be configured to control the switching circuit according to the time-division signal.

In accordance with an aspect of the present disclosure, there is provided a display device, comprising: a modulation integrated circuit (IC) configured to receive a direct current (DC) voltage and to output the DC voltage or a modulated voltage having a plurality of levels; and a capacitive element connected to an input end of the modulation IC and configured to be additionally connected to an output end of the modulation IC if the DC voltage is output from the modulation IC and to be disconnected from the output end of the modulation IC if the modulated voltage is output from the modulation IC.

The display device may further include a switching circuit disposed between the input end and the output end of the modulated IC, and configured to control connection of the capacitive element according to a switching control signal that determines connection and disconnection between the capacitive element and the output end of the modulation IC.

The switching circuit may be configured to connect the capacitive element to the output end of the modulation IC in a first interval in which image data is output and to disconnect the capacitive element therefrom in a second interval in which a touch or proximity of an external object is sensed.

The display device may further include a power management integrated circuit (IC) configured to receive power supplied via a first terminal and to supply the DC voltage to the modulation IC via a second terminal.

In accordance with an aspect of the present disclosure, there is provided a display device, comprising: a modulation integrated circuit (IC) configured to receive a direct current (DC) voltage and to output the DC voltage or a modulated voltage having a plurality of levels; and a capacitive element configured to be connected to an output end of the modulation IC if the DC voltage is output from the modulation IC and configured to be disconnected from the output end of the modulation IC if the modulated voltage is output from the modulation IC, and the modulation IC may comprise a switching circuit configured to control connection of the capacitive element according to a switching control signal that determines connection or disconnection of the capacitive element to or from the output end of the modulation IC.

The capacitive element may be disposed outside the modulation IC.

The switching circuit may be configured to connect the capacitive element to the output end of the modulation IC in a first interval in which image data is output and to disconnect the capacitive element from the output end of the modulation IC in a second interval in which a touch or proximity of an external object is sensed.

As described above, according to the embodiments, a plurality of signals having different characteristics, for example, a time-invariant signal and a time-variant signal, may be stably provided to a panel driving IC according to a display operation or a touch operation.

According to the embodiments, the effect of noise on a plurality of signals having different characteristics may be excluded by controlling capacitance connected to a transmission conducting wire.

DETAILED DESCRIPTION OF THE EXEMPLARY EMBODIMENTS

Figure 1:
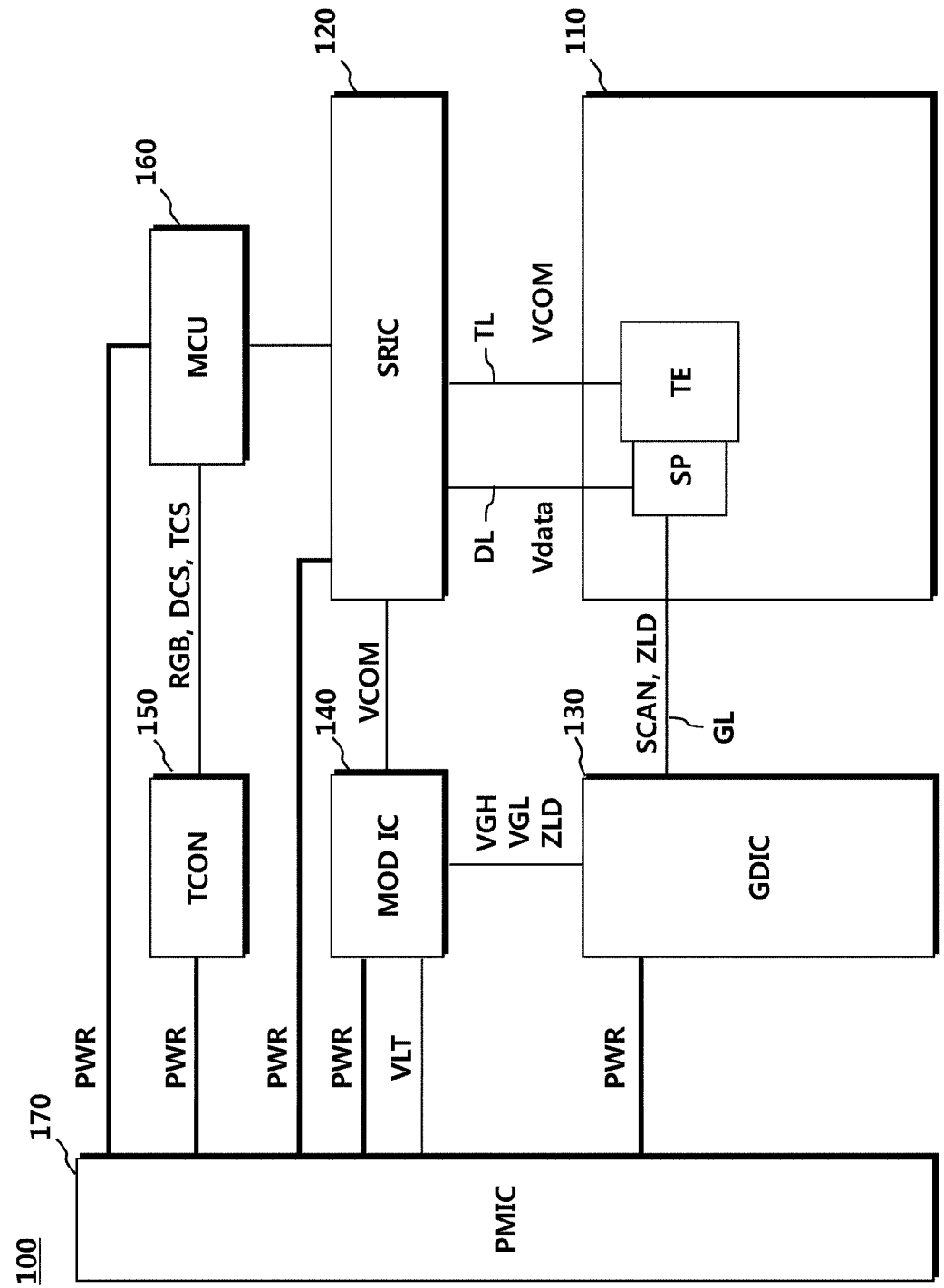
FIG. 1 is a diagram illustrating the configuration of a display device according to an embodiment of the present disclosure.

FIG. 1 is a diagram illustrating the configuration of a display device.

Referring to FIG. 1, a display device 100 may include a panel 110, a source readout IC (SRIC) 120, a gate driver IC (GDIC) 130, a modulation IC (MOD IC) 140, a timing controller (TCON) 150, a microcontroller (MCU) 160, and a power management IC (PMIC) 170.

In the panel 110, a plurality of data lines (DL) and a plurality of gate lines (GL) may be disposed, and a plurality of pixels may be disposed. A pixel may include a plurality of sub-pixels (SPs). Here, a sub-pixel may be red (R), green (G), blue (B), white (W), or the like. A single pixel may include RGB sub-pixels (SP), RGBG sub-pixels (SP), RGBW sub-pixels (SP), or the like. Hereinafter, for ease of description, it is illustrated that a single pixel includes RGB sub-pixels (SP).

The source readout IC 120, the gate driving IC 130, and the timing controller 150 may be devices for receiving, producing, and transmitting signals in order to display an image in the panel 110. The source readout IC 120 and the microcontroller 160 may be devices for receiving, producing, and transmitting signals for sensing a touch input to the panel 110.

The source readout IC 120 may include a source driver IC (SDIC) therein. The source driver IC may supply a data voltage (Vdata) to a sub pixel (SP) via a data line (DL). The data voltage (Vdata) supplied via the data line (DL) may be supplied to a sub-pixel (SP) according to a gate driving signal (SCAN).

In addition, the source readout IC 120 may include a readout IC (ROIC) therein. The readout IC, together with the source driver IC, may be included in the source readout IC 120. The readout IC may drive a touch electrode (TE) adjacent to a sub-pixel (SP) and may sense a touch input. Here, a common electrode used for a display operation may function as a touch electrode (TE), and the readout IC may provide a common voltage (VCOM) to the common electrode. The readout IC may receive a common voltage (VCOM) from the modulation IC 140. The source readout IC 120 may drive a touch electrode (TE) using a touch line (TL), and may receive an analog signal from the touch electrode (TE).

Here, if the source readout IC 120 provides a data voltage (Vdata) via the source driver IC, the modulation IC 140 may produce a common voltage (VCOM) which has a time-invariant characteristic and is provided in a DC form. The DC-type common voltage (VCOM) may be provided to a touch electrode (TE) in a display interval. In addition, if the source readout IC 120 senses a touch electrode (TE) via the readout IC, the modulation IC 140 may produce a common voltage (VCOM) which has a period and a time-variant characteristic. The common voltage (VCOM) having a period may be provided to a touch electrode (TE) in a touch interval.

The source readout IC 120 may be connected to a bonding pad of the panel 110 in a manner of a tape automated bonding (TAB) type or a chip on glass (COG) type, may be directly disposed on the panel 110, or may be integrated with the panel 110 depending on an embodiment. In addition, the source readout IC 120 may be implemented in a manner of a chip on film (COF) type.

The gate driver IC 130 may supply a gate driving signal (SCAN) of a turn-on voltage or a turn-off voltage via a gate line (GL). If a gate driving signal of a turn-on voltage is supplied to a sub-pixel (SP), the sub-pixel (SP) is connected to a data line (DL). If a gate driving signal (SCAN) of a turn-off voltage is supplied to a sub-pixel (SP), the connection between the sub-pixel (SP) and the data line (DL) is disconnected.

The modulation IC 140 may supply a DC voltage or a modulated voltage to the panel driving IC. Here, the panel driving IC may drive a sub-pixel (SP) in order to display image data (RGB). The panel driving IC may include a gate driver IC and a source driver IC. In addition, the panel driving IC may drive a touch electrode (TE) in order to sense a touch or proximity of an external object. Accordingly, the panel driving IC may include a readout IC. In addition, the panel driving IC may include a source readout IC which includes a source driver IC and a readout IC therein.

A DC voltage may be used as a voltage that drives a sub-pixel (SP) in the panel driving IC. The DC voltage may be a voltage that has a time-invariant characteristic and maintains a level having a constant magnitude or a level in a predetermined range. Conversely, a modulated voltage may be used as a voltage that drives a touch electrode (TE) in the panel driving IC. The modulated voltage may be a voltage having a time-variant characteristic. The modulated voltage may be an alternating current (AC) voltage. The AC voltage may include a pulse voltage that has at least one pulse, a periodic voltage that has a period greater than or equal to 1, or a sinusoidal voltage that continuously varies among a plurality of levels.

A common voltage (VCOM) is a voltage transmitted to the source readout IC 120. The common voltage may be a DC voltage having a time-invariant characteristic in a display interval in which the display device 100 outputs image data (RGB) and the common voltage may be a modulated voltage having a time-variant characteristic in a touch interval in which the display device 100 senses a touch or proximity of an external object. The modulation IC 140 may receive a driving voltage (VLT) from the power management IC 170. The modulation IC 140 may convert a driving voltage (VLT) into a time-invariant common voltage (VCOM) in a display interval, or may convert a driving voltage (VLT) into a time-variant common voltage (VCOM) in a touch interval. Alternatively, a driving voltage (VLT) may be provided in a DC form and thus, the modulation IC 140 may use the driving voltage (VLT) intactly as a time-invariant common voltage (VCOM) in a display interval.

A gate high voltage (VGH) and a gate low voltage (VGL) may be a DC voltage having a time-invariant characteristic or a modulated voltage having a time-variant characteristic, which is transmitted to the gate driver IC 130. The gate driver IC 130 may produce a gate driving signal (SCAN) from a gate high voltage (VGH) and a gate low voltage (VGL). For example, the gate driver IC 130 may produce a pulse by alternately combining a high voltage level of a time-invariant gate high voltage (VGH) and a low voltage level of a time-invariant gate low voltage (VGL), and may use the produced pulse as a gate driving signal (SCAN). The modulation IC 140 may receive a driving voltage (VLT) from the power management IC 170. The modulation IC 140 may convert a driving voltage (VLT) into a time-invariant gate high voltage (VGH) and time-invariant gate low voltage (VGL), or may convert a driving voltage (VLT) into a time-variant gate high voltage (VGH) and a time-variant gate low voltage (VGL). Alternatively, a driving voltage (VLT) may be provided in a DC form and thus, the modulation IC 140 may use the driving voltage (VLT) intactly as a time-invariant gate high voltage (VGH) and a time-invariant gate low voltage (VGL).

In addition, the modulation IC 140 may produce a zero load driving (ZLD) voltage and transmit the same to the source readout IC 120 and the gate driver IC 130, in order to reduce the effect of parasitic capacitance of a touch sensor on a sensing result. The zero load driving voltage (ZLD) may have the same phase and magnitude as those of a touch driving voltage that drives a touch sensor. If the zero load driving voltage (ZLD) is provided together with the touch driving voltage to both ends of a parasitic capacitor, the amount of charges which the parasitic capacitor is charged with may be 0 and thus, the parasitic capacitance may be removed.

For example, if the common voltage (VCOM) is used as a touch driving voltage that drives a touch sensor, that is, a touch electrode (TE), the zero road driving voltage (ZLD) may have the same phase and magnitude as those of the common voltage (VCOM). Therefore, the modulation IC 140 may transmit a zero load driving (ZLD) voltage to the gate driver IC 130, and the gate driver IC 130 may transmit a zero load driving (ZLD) voltage to the panel 110 via a gate line (GL).

The timing controller 150 may supply a control signal to the gate driving IC 130 and the microcontroller 160. For example, the timing controller 150 may transmit a gate control signal which starts scanning, to the gate driver IC 130. The timing controller 150 may output image data (RGB) to the microcontroller 160. In addition, the timing controller 150 may transmit, to the microcontroller 160, a data control signal (DCS) which controls the source readout IC 120 to supply a data voltage (Vdata) to each subpixel (SP). In addition, the timing controller 140 may transmit, to the microcontroller 160, a touch control signal (TCS) which controls the source readout IC 120 to drive a touch electrode of each subpixel (SP) so as to sense a touch input.

The microcontroller 160 may perform data transmission or reception with the source readout IC 120. The microcontroller 160 may transmit control data for controlling the source readout IC 120, and a clock for synchronizing data and image data (RGB) provided to the panel 110 to the source readout IC 120. The source readout IC 120 may produce sensing data by sensing a touch or proximity of an external object via a touch sensor, and may transmit the sensing data to the microcontroller 160.

The microcontroller 160 and the source readout IC 120 may perform communication according to a serial peripheral interface (SPI) scheme or an inter-integrated circuit (I2C) scheme. The subjects of the communication in the SPI or I2C scheme may operate as a master and a slave. The microcontroller 160 may operate as a master and the source readout IC 120 may operate as a slave, respectively. The source readout IC 120 may be plural in number, and each source readout IC 120 may act as a slave for the microcontroller 160.

The power management IC 170 may supply power to the panel 110, the source readout IC 120, the gate driver IC 130, the modulation IC 140, the timing controller 150, and the microcontroller 160. The power management IC 170 may supply power by transmitting a power voltage (PWR) via a power line. Power voltages (PWR) having different voltage values may be provided to respective circuits. A power voltage (PWR) may be processed to have a voltage and a current appropriate for operation of each circuit, and the processed power voltage (PWR) may be supplied to the corresponding circuit. The power management IC 170 may act as a power supply source for the internal circuit of the display device 100.

In addition, the power management IC 170 may supply a driving voltage (VLT) to the modulation IC 140. The power management IC 170 may receive power supplied via a first terminal, and may produce and supply a driving voltage (VLT) to the modulation IC 140 via a second terminal. The modulation IC 140 may produce a DC voltage or a modulated voltage by converting a driving voltage (VLT), and may transmit the DC voltage or modulated voltage to the source readout IC 120 and the gate driver IC 130. The driving voltage (VLT) and the DC voltage may have a time-invariant characteristic. Conversely, the modulated voltage may have a time-variant characteristic. In addition, the driving voltage (VLT) may be provided in a DC form and thus, the modulation IC 140 may use the driving voltage (VLT) intactly as the DC voltage.

Figure 2:
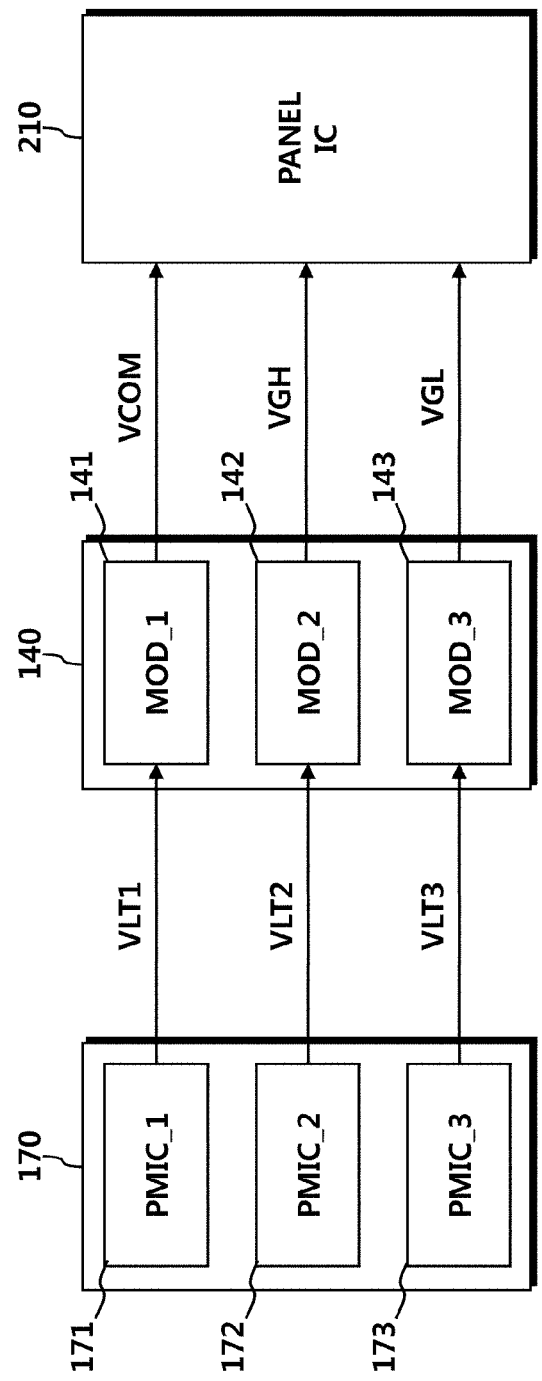
FIG. 2 is a diagram illustrating production and transmission of a driving voltage in a power management integrated circuit (IC), and production and transmission of a common electrode voltage, gate low voltage, and gate high voltage in a modulation integrated circuit (IC) according to an embodiment of the present disclosure.

FIG. 2 is a diagram illustrating production and transmission of a driving voltage in a power management circuit, and production and transmission of a common electrode voltage, gate low voltage, and gate high voltage in a modulation circuit according to an embodiment of the present disclosure.

Referring to FIG. 2, a process of producing a common electrode voltage (VCOM), a gate low voltage (VGL), and a gate high voltage (VGH) from driving voltages (VLT1, VLT2, and VLT3) is illustrated.

The power management IC 170 may include a first power management IC (PMIC_1) 171, a second power management IC (PMIC_2) 172, and a third power management IC (PMIC_3) 173, so as to produce driving voltages (VLT1, VLT2, VLT3) having different characteristics. Here, the driving voltages may have different voltage levels. The driving voltages (VLT1, VLT2, and VLT3) which are produced by the different power management ICs and have different characteristics may be converted into different types of modulated voltages, such as a common electrode voltage (VCOM), a gate low voltage (VGL), and a gate high voltage (VGH), via the modulation IC 140.

The modulation IC 140 may include a first modulation IC (MOD_1) 141, a second modulation IC (MOD_2) 142, and a third modulation IC (MOD_3) 143, so as to produce a common electrode voltage (VCOM), a gate low voltage (VGL), and a gate high voltage (VGH). Here, the produced voltage may have different voltage levels and different phases depending on the purpose. The common voltage (VCOM) may be transmitted to a source readout IC in order to drive a touch electrode (TE) in a display interval and a touch interval. The gate high voltage (VGH) and the gate low voltage (VGL) may be transmitted to a gate driver IC in order to be used as a scan signal for connecting a pixel and a data line.

For example, the first power management IC 171 may produce and transmit a first driving voltage (VLT1) to the first modulation IC 141. The first modulation IC 141 may be a circuit for producing a common voltage (VCOM), and may convert the first driving voltage (VLT1) into a common voltage (VCOM). Alternatively, the first modulation IC 141 may intactly use the first driving voltage (VLT1) provided in a DC form as a common voltage (VCOM). In addition, the second power management IC 172 may produce and transmit a second driving voltage (VLT2) to the second modulation IC 142. The second modulation IC 142 may be a circuit for producing a gate high voltage (VGH), and may convert the second driving voltage (VLT2) into a gate high voltage (VGH). Alternatively, the second modulation IC 142 may intactly use the second driving voltage (VLT2) provided in a DC form as a gate high voltage (VGH). In addition, the third power management IC 173 may produce and transmit a third driving voltage (VLT3) to the third modulation IC 143. The third modulation IC 143 may be a circuit for producing a gate low voltage (VGL), and may convert the third driving voltage (VLT3) into a gate low voltage (VGL). Alternatively, the third modulation IC 143 may intactly use the third driving voltage (VLT3) provided in a DC form as a gate low voltage (VGL).

Here, the first to third driving voltages (VLT1, VLT2, and VLT3) may have a time-invariant characteristic. Conversely, the common electrode voltage (VCOM), the gate low voltage (VGL), and the gate high voltage (VGH) may have a time-invariant characteristic or a time-variant characteristic. If a voltage has a time-invariant characteristic, it may be considered that the voltage has a level having a predetermined magnitude or a level in a predetermined range, irrespective of time. Therefore, the DC voltage may have a time-invariant characteristic. If a voltage has a time-variant characteristic, it may be considered that the voltage has a level that varies over time. Therefore, an alternating current (AC) voltage, such as a pulse voltage or a periodic voltage, may have a time-variant characteristic.

Therefore, the modulation IC 140 may convert the first to third driving voltages (VLT1, VLT2, and VLT3) having a time-invariant characteristic into time-invariant voltages or time-variant voltages, depending on the case. Alternatively, the modulation IC 140 may intactly use the first to third driving voltages (VLT1, VLT2, and VLT3) having a time-invariant characteristic as time-invariant voltages. Desirably, the modulation IC 140 may produce a time-invariant voltage such as a DC voltage in a display interval during which image data is displayed in a panel, and may produce a time-variant voltage such as a modulated voltage in a touch interval during which a touch or proximity of an external object is sensed.

Figure 3:
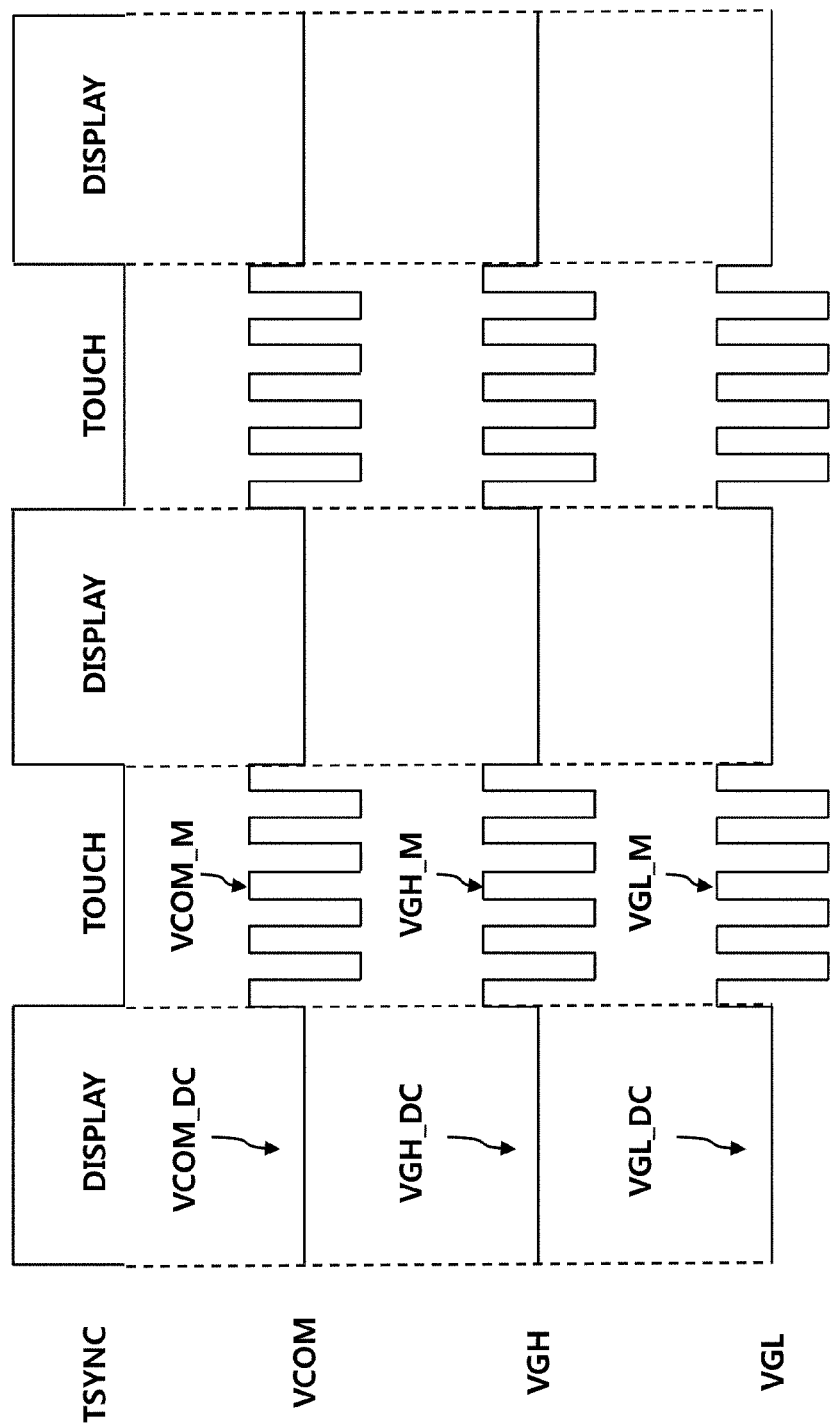
FIG. 3 is a diagram illustrating a time-invariant direct current (DC) voltage in a display interval and a time-variant modulated voltage in a touch interval according to an embodiment of the present disclosure.

FIG. 3 is a diagram illustrating a time-invariant direct current (DC) voltage in a display interval and a time-variant modulated voltage in a touch interval according to an embodiment of the present disclosure.

Referring to FIG. 3, a modulation IC may produce a DC voltage or a modulated voltage according to a display interval and a touch interval. The modulation IC may produce and supply a DC voltage having a time-invariant characteristic to a panel driving IC in the display interval, and may produce and supply a modulated voltage having a time-variant characteristic to the panel driving IC in the touch interval. Here, the modulated voltage having a time-variant characteristic may include a pulse voltage, a periodic voltage, or an alternating current (AC) voltage.

According to an embodiment of the present disclosure, a time-division signal (TSYNC) may determine a timing and a duration for each of the display interval and the touch interval. The time-division signal (TSYNC) may be a vertical synchronization signal or a horizontal synchronization signal itself, or may be a signal derived therefrom. Therefore, the time-division signal (TSYNC) may be produced mainly from a timing controller, but it is not limited thereto and may be produced from a microcontroller or a source readout IC. In the drawing, DISPLAY denotes the display interval and TOUCH denotes the touch interval.

According to a time-division signal (TSYNC), the display device may output image data in the display interval, and may sense a touch or proximity of an external object in the touch interval. A panel may output image data in the display interval, and may sense a touch or proximity of an external object in the touch interval and thus, the panel driving IC, for example, the gate driving IC and the source readout IC, may receive a DC voltage or a modulated voltage from the modulation IC according to each interval. The modulation IC may transmit a DC voltage having a time-invariant characteristic to the panel driving IC in the display interval, and may transmit a modulated voltage having a time-variant characteristic to the panel driving IC in the touch interval.

For example, the source readout IC may receive a direct common voltage (VCOM_DC) to be delivered to a common electrode in the display interval. The source readout IC may receive a modulated common voltage (VCOM_M) to be delivered to a common electrode in the touch interval. The modulated common voltage (VCOM_M) may be a signal of which a voltage magnitude varies between a low level and a high level. The DC common voltage (VCOM_DC) may be a signal of which a voltage magnitude constantly maintains a medium level between the low level and the high level.

In the same manner, the gate driver IC may receive a DC gate high voltage (VGH_DC) in the display interval. The gate driver IC may receive a modulated gate high voltage (VGH_M) to be supplied to a panel via a gate line in the touch interval. The modulated gate high voltage (VGH_M) may be a signal of which a voltage magnitude varies between a low level and a high level. The DC gate high voltage (VGH_DC) may be a signal of which a voltage magnitude constantly maintains a medium level between the low level and the high level.

In addition, the gate driver IC may receive a DC gate low voltage (VGL_DC) in the display interval. The gate driver IC may receive a modulated gate low voltage (VGL_M) to be supplied to a panel via a gate line in the touch interval. The modulated gate low voltage (VGL_M) may be a signal of which a voltage magnitude varies between a low level and a high level. The DC gate low voltage (VGL_DC) may be a signal of which a voltage magnitude constantly maintains a medium level between the low level and the high level.

Figure 4:
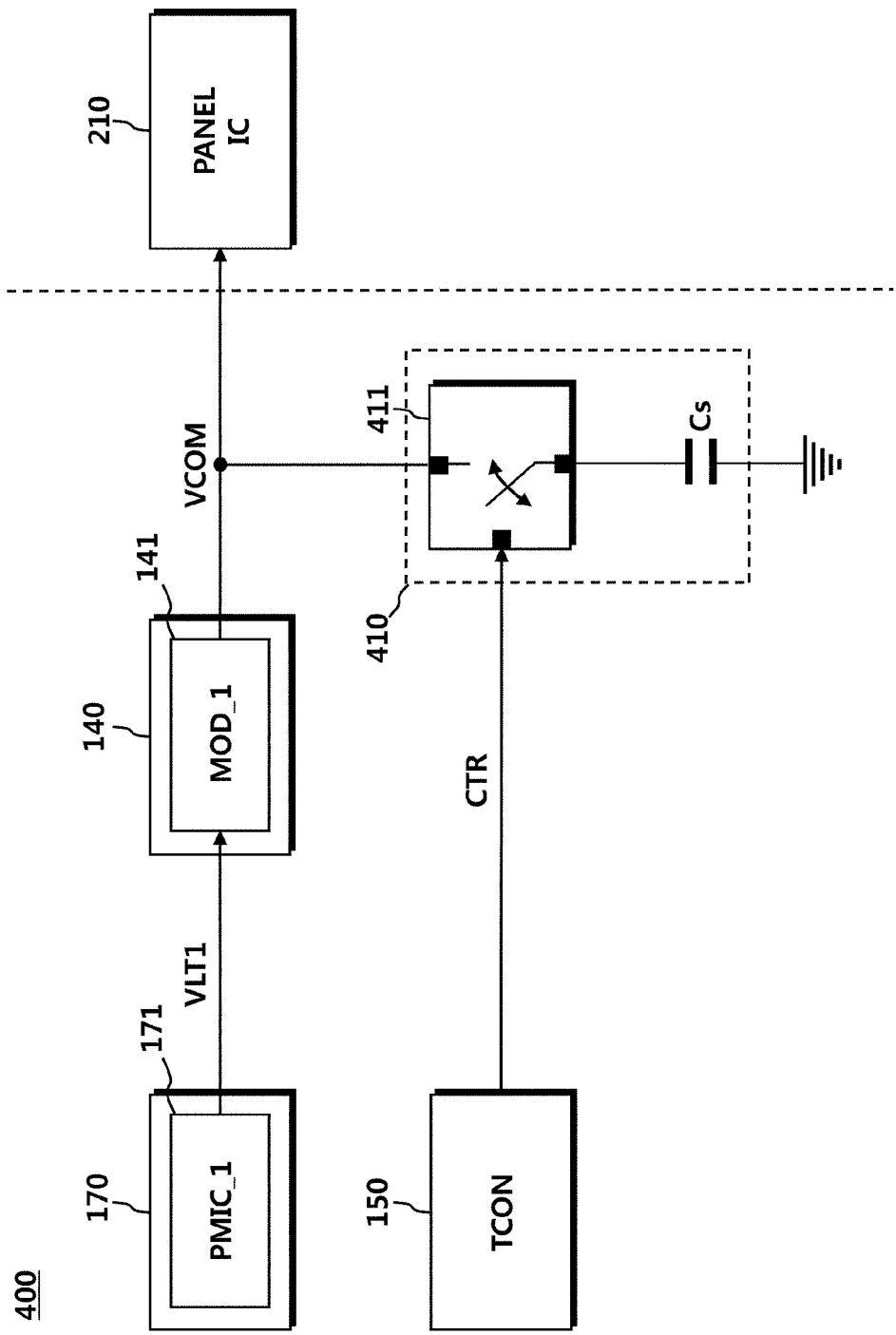
FIG. 4 is a diagram illustrating a first configuration of a signal supply device including a signal stabilization circuit according to an embodiment of the present disclosure.

FIG. 4 is a diagram illustrating a first configuration of a signal supply device including a signal stabilization circuit according to an embodiment of the present disclosure.

Referring to FIG. 4, a signal supply device 400 according to an embodiment may include the modulation IC 140, the timing controller 150, the power management IC 170, and a signal stabilization circuit 410. The signal stabilization circuit 410 may stabilize a direct current (DC) voltage or a modulated voltage output from the modulation IC 140.

The power management IC 170 may supply a driving voltage to the modulation IC 140. The driving voltage may be converted to a DC voltage or a modulated voltage by the modulation IC 140. Alternatively, the driving voltage may be intactly used as a DC voltage by the modulation IC 140.

For example, if the first power management IC 171 supplies a first driving voltage (VLT1) to the first modulation IC 141, the first modulation IC 141 may convert the first driving voltage (VLT1) into a common voltage (VCOM), for example, a DC common voltage or a modulated common voltage.

The modulation IC 140 may supply a DC voltage or a modulated voltage to the panel driving IC 210. The DC voltage may be provided to a pixel electrode of a panel by the panel driving IC 210, and the modulated voltage may be provided to a touch sensor of the panel, for example, a touch electrode, by the panel driving IC 210. The modulated IC 140 may produce a time-invariant voltage in a display interval, and may produce a time-variant voltage in a touch interval. For example, the first modulated IC 141 may produce and output a DC common voltage in the display interval, and may produce and output a modulated common voltage in the touch interval.

The signal stabilization circuit 410 may include a switching circuit 411 and a capacitive element. The switching circuit 411 may be disposed between the capacitive element and the output end of the modulation IC 140, and may connect the capacitive element to the output end of the modulation IC 140, or may disconnect the capacitive element therefrom. The capacitive element may be used in order to stably supply a DC voltage or a modulated voltage to the panel driving IC 210. The signal stabilization circuit 410 may connect the capacitive element to the output end of the modulation IC 140, or may disconnect the capacitive element therefrom according to a DC voltage or a modulated voltage.

For example, if the modulation IC 140 supplies a DC common voltage to the panel driving IC 210 in a display interval, the switching circuit 411 may connect the capacitor (Cs) to the output end of the modulation IC 140. The capacitor (Cs) may increase the capacitance in a transmission conducting wire and may help a DC common voltage maintain a constant level without being affected by noise. The level of the DC common voltage does not vary. Alternatively, if the modulation IC 140 supplies a modulated common voltage to the panel driving IC 210 in a touch interval, the switching circuit 411 may disconnect the capacitor (Cs) from the output end of the modulation IC 140. Disconnection of the capacitor (Cs) may decrease capacitance and thus, the modulated common voltage may rapidly change its level. The speed of a response of varying the level of the modulated common voltage may be increased.

The signal stabilization circuit 410 may receive a switching control signal (CTR) for controlling opening and closing of the switching circuit 411. The timing controller 150 may produce a switching control signal (CTR). A time-division signal (TSYNC) or a signal derived from a time-division signal (TSYNC) may be used as a switching control signal (CTR). The switching circuit 411 may connect or disconnect the capacitor (Cs) according to a display interval and a touch interval defined by the switching control signal (CTR).

Figure 5:
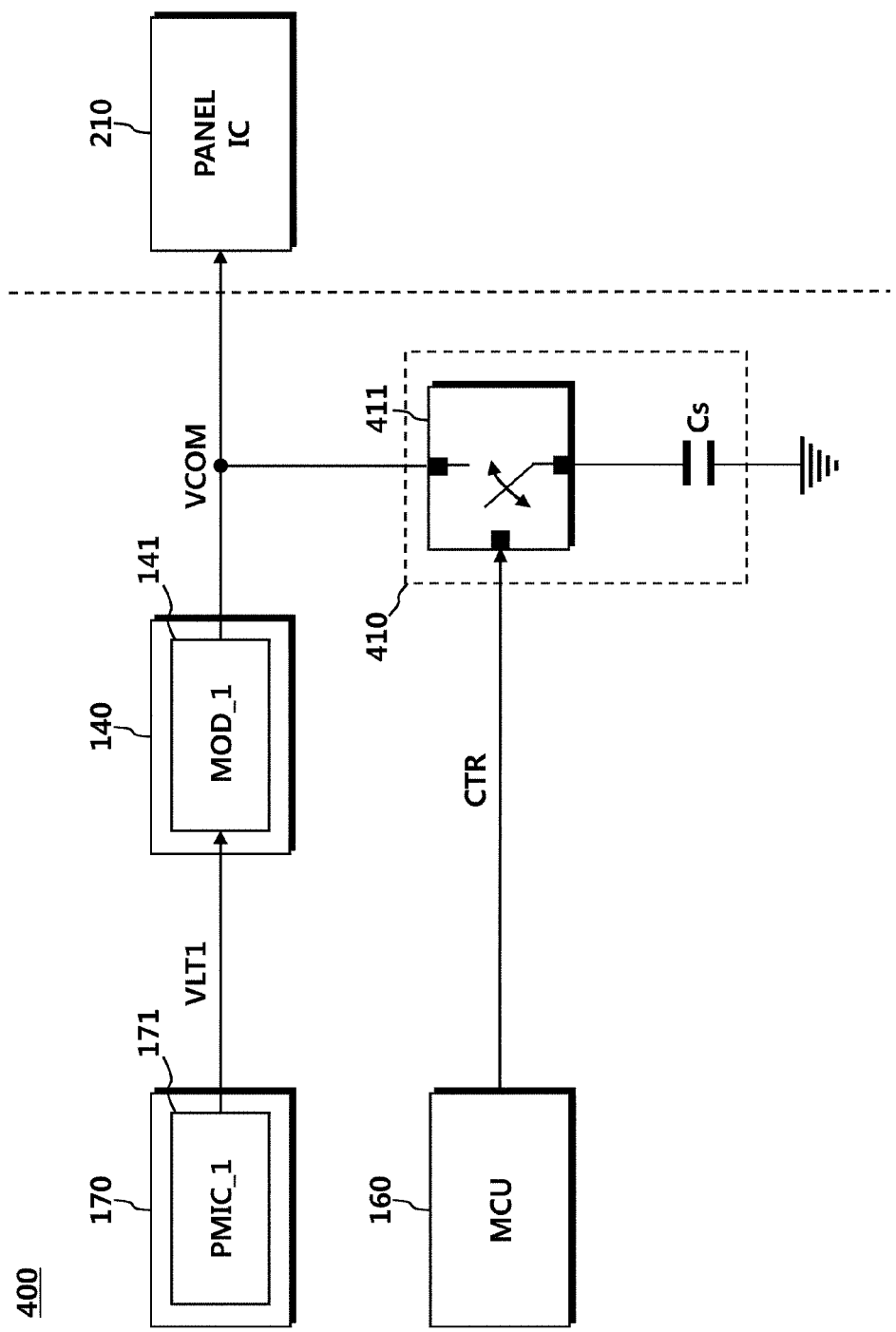
FIG. 5 is a diagram illustrating a second configuration of a signal supply device including a signal stabilization circuit according to an embodiment of the present disclosure.

FIG. 5 is a diagram illustrating a second configuration of a signal supply device including a signal stabilization circuit according to an embodiment of the present disclosure.

Referring to FIG. 5, a signal supply device 400 according to an embodiment may receive a switching control signal (CTR) from a circuit other than a timing controller.

For example, the microcontroller 160 may produce a switching control signal (CTR) and may transmit the same to the signal stabilization circuit 410. In addition, the switching control signal (CTR) may be produced from the power management IC 170 or the panel driving IC 210, and may be transmitted to the signal stabilization circuit 410. A source driver IC, a readout IC, and a source readout IC in the panel driving IC 210 may produce a switching control signal (CTR). Here, the switching control signal (CTR) may be produced from a time-division signal (TSYNC) or a signal derived from the time-division signal (TSYNC).

Figure 6:
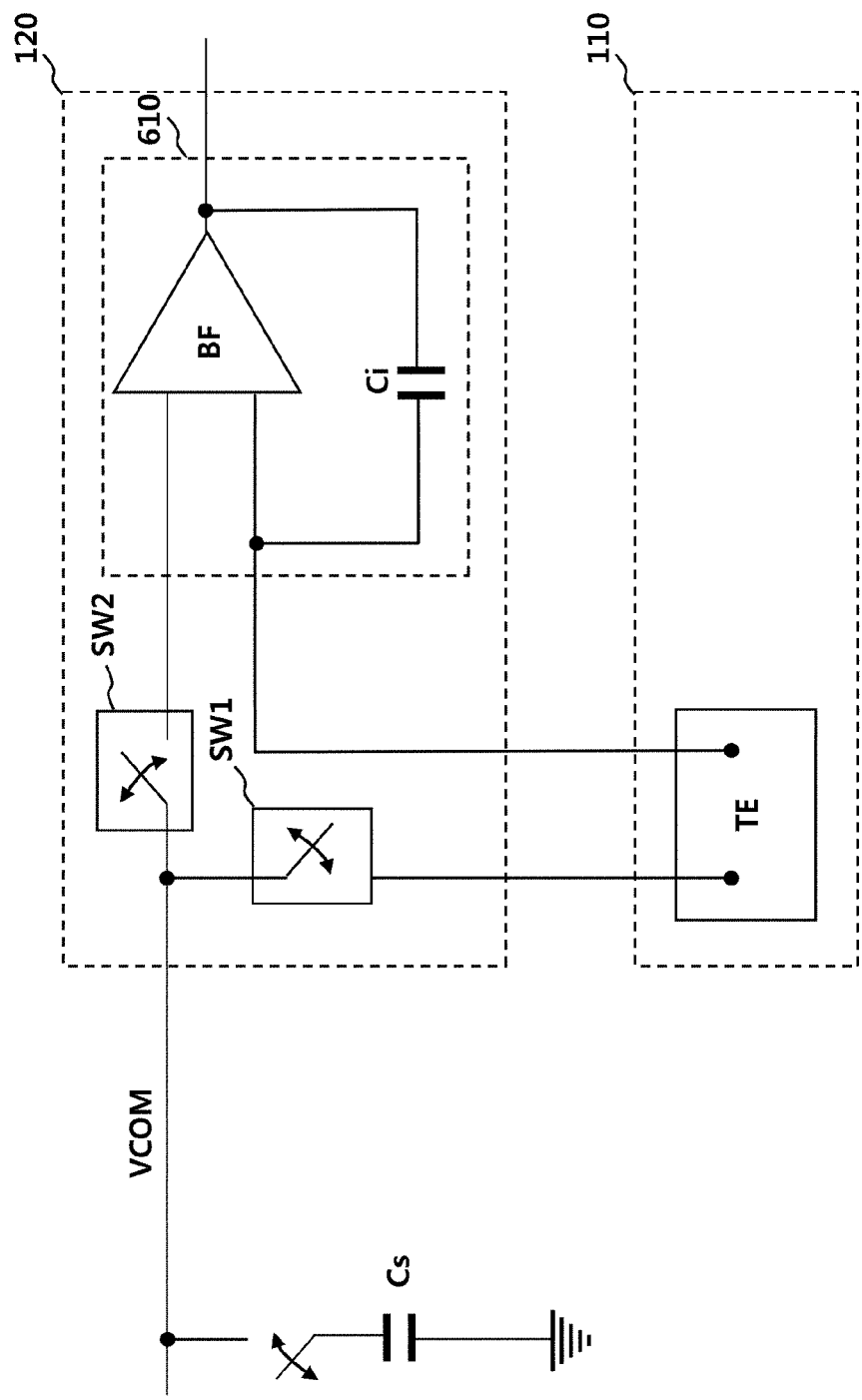
FIG. 6 is a diagram illustrating a process in which a time-invariant DC voltage and a time-variant modulated voltage are transmitted to a panel according to an embodiment of the present disclosure.

FIG. 6 is a diagram illustrating a process in which a time-invariant direct current (DC) voltage and a time-variant modulated voltage are transmitted to a panel according to an embodiment of the present disclosure.

Referring to FIG. 6, a DC voltage or a modulated voltage may be transmitted to the panel 110 via a panel driving IC. A process in which a time-invariant DC voltage arrives at the panel 110 and a process in which a time-variant modulated voltage arrives at the panel 110 may be different from each other. The time-invariant DC voltage and the time-variant modulated voltage may be used for different purposes. Hereinafter, a process in which a common voltage (VCOM) arrives at a touch electrode (TE) of the panel 110 via the source readout circuit 120 may be described as an example.

For example, the common voltage (VCOM) may be used in both a display interval and a touch interval. The modulation IC may supply a common voltage (VCOM) to the source readout IC 120. The modulation IC may produce and supply a DC common voltage having a time-invariant characteristic in a display interval, and may produce and supply a modulated common voltage having a time-variant characteristic in a touch interval.

In the display interval, a common voltage (VCOM), that is, a DC common voltage, may be input to an analog front end of the source readout IC 120. A first switching device (SW1) of the source readout IC 120 may be shorted and a second switching device (SW2) may be open. The DC common voltage may be input to a touch electrode (TE) along with the first switching device (SW1). The touch electrode (TE) may be used as a common electrode in the display interval, and image data may be output based on a difference in voltage between a data voltage and the DC common voltage provided to the touch electrode (TE).

In the touch interval, a common voltage (VCOM), that is, a modulated common voltage, may also be input to the analog front end of the source readout IC 120. The first switching device (SW1) of the source readout IC 120 may be open and the second switching device (SW2) may be shorted. The modulated common voltage may be provided to one terminal of an amplifier (BF) along with the second switching device (SW2), and at the same time, may be provided to the touch electrode (TE). An integrator 610 including the amplifier (BF) and a capacitor (Ci) may receive a response signal from the touch electrode (TE) in response to the modulated common voltage, and may produce sensing data. The sensing data may include information associated with a touch or proximity of an external object.

Figure 7:
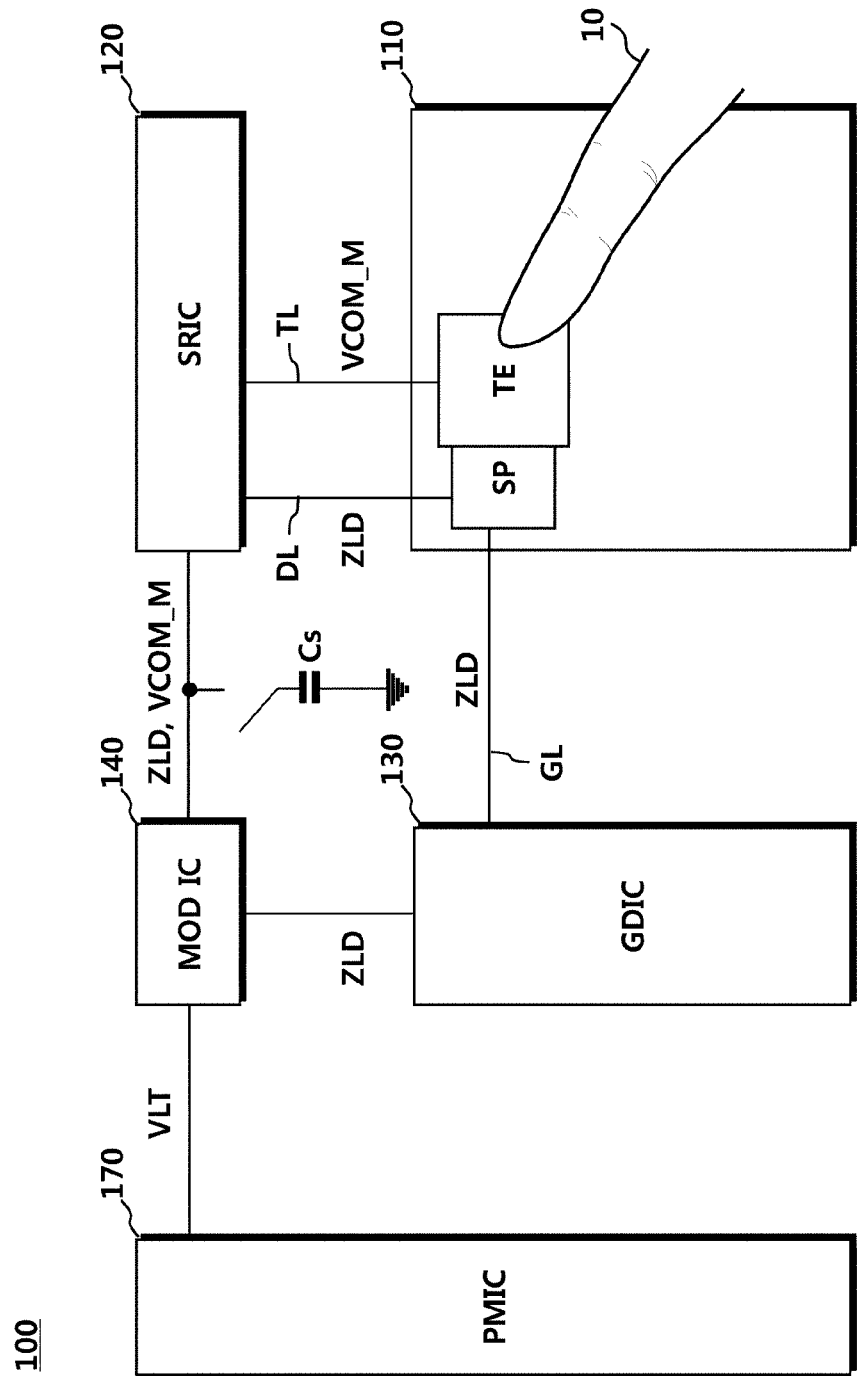
FIG. 7 is a diagram illustrating a zero load driving voltage supplied to a panel according to an embodiment of the present disclosure.

FIG. 7 is a diagram illustrating operations of a zero load driving voltage supplied to a panel according to an embodiment of the present disclosure.

Referring to FIG. 7, the modulation IC 140 may produce a modulated voltage as a zero load driving voltage (ZLD). In order to increase sensing sensitivity associated with a touch or an proximity of an external object 10, the effect of parasitic capacitance around a touch electrode (TE) needs to be decreased. If a voltage that is equal to a touch driving voltage for the touch electrode (TE) is provided to a conducting wire around the touch electrode (TE), the effect of parasitic capacitance may be reduced. The voltage that is equal to the touch driving signal for the touch electrode (TE) may be understood as a zero load driving voltage.

In a touch interval, the modulation IC 140 may receive a driving voltage (VLT) from the power management IC 170, may produce a modulated common voltage (VCOM_M) from the driving voltage (VLT), and may supply the same to the source readout IC 120. Here, a capacitor (Cs) may stabilize the modulated common voltage (VCOM_M) without being connected to the output end of the modulated IC 140. If the modulated common voltage (VCOM_M) gets to have a quick output response, it may be understood as stabilization. The source readout IC 120 may provide the modulated common voltage (VCOM_M) to a touch electrode (TE) via a touch line (TL).

The modulation IC 140 may supply, to the source readout IC 120, a zero load driving voltage (ZLD) which is a signal identical to the modulated common voltage (VCOM_M). The source readout IC 120 may supply the zero load driving voltage (ZLD) to a sub-pixel (SP) via a data line (DL). At the same time, the modulation IC 140 may supply a zero load driving voltage (ZLD) to the gate driver IC 130. The gate driver IC 130 may supply the zero load driving voltage (ZLD) to a sub-pixel (SP) via a gate line (GL). The zero load driving voltage (ZLD) of the data line (DL) and the zero load driving voltage (ZLD) of the gate line (GL) may decrease parasitic capacitance around the touch electrode (TE).

Figure 8:
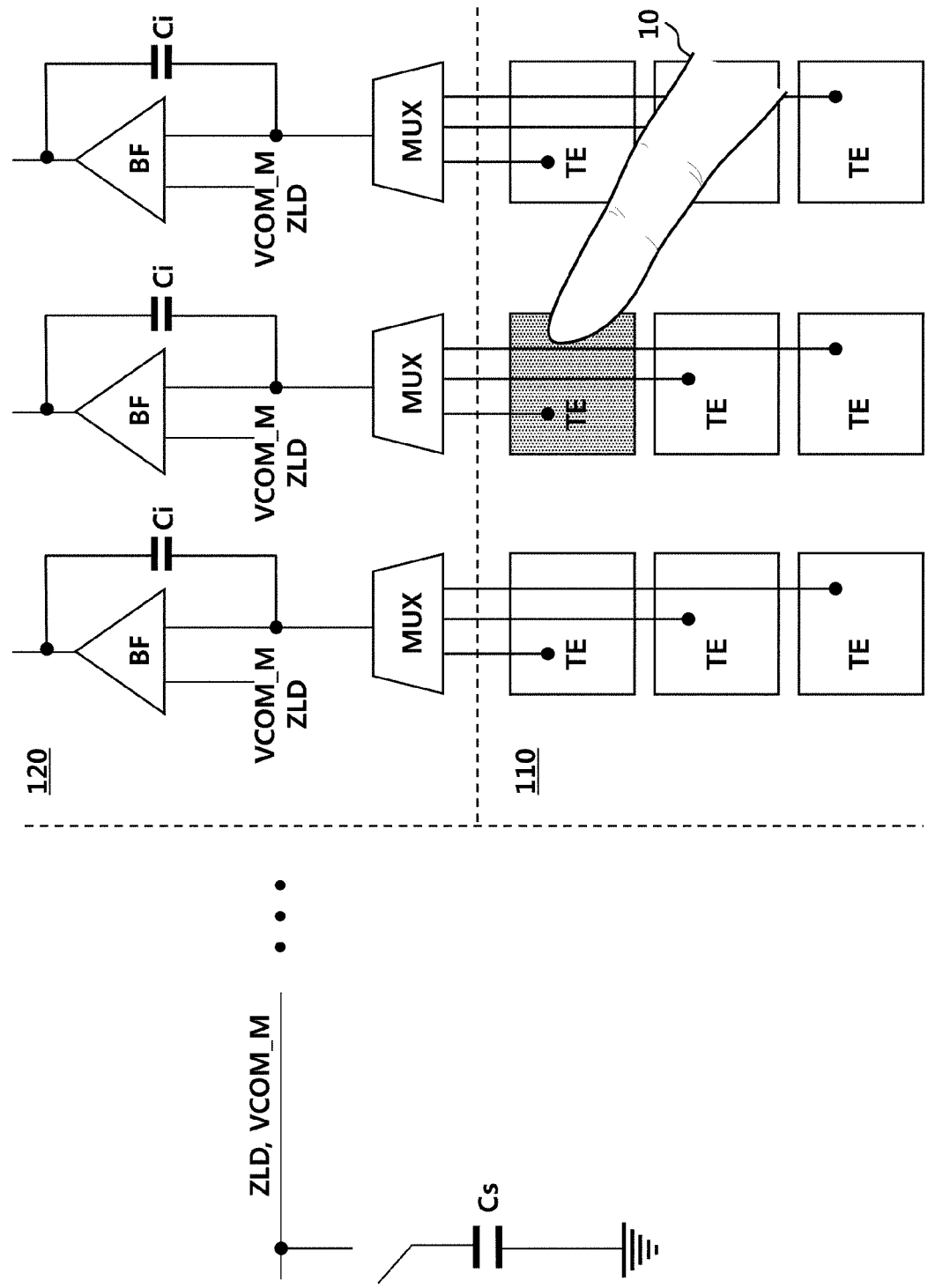
FIG. 8 is a diagram illustrating a zero load driving voltage that drives a touch electrode according to an embodiment of the present disclosure.

FIG. 8 is a diagram illustrating a zero load driving voltage that drives a touch electrode according to an embodiment of the present disclosure.

Referring to FIG. 8, the source readout IC 120 may supply a modulated voltage and a zero load driving voltage (ZLD) to a touch electrode (TE) in a touch interval. A modulation IC of a signal supply device may produce and supply a modulated voltage and a zero load driving voltage (ZLD) to the source readout IC 120. Here, the connection between a capacitor (Cs) and the output end of the modulation IC may be disconnected.

The source readout IC 120 may provide a modulated common voltage (VCOM_M) to a touch electrode (TE), and may sense a change in capacitance that varies depending on a touch or proximity of the external object 10. In the drawing, a touch electrode (TE) in which the external object 10 is located may be shaded.

At the same time, in order to decrease the effect of ambient parasitic capacitance, the source readout IC 120 may provide a zero load driving voltage (ZLD) to an ambient touch electrode (TE) that is beyond the effect of the external object 10. The zero load driving voltage (ZLD) provided to the ambient touch electrode (TE) may be a signal having a characteristic identical to that of the modulated common voltage (VCOM_M), and as such, the occurrence of parasitic capacitance may be suppressed. A zero load driving voltage (ZLD) additionally provided to a gate line and a data line may also remove parasitic capacitance that is produced between the touch electrode (TE) and the gate line and data line.

Figure 9:
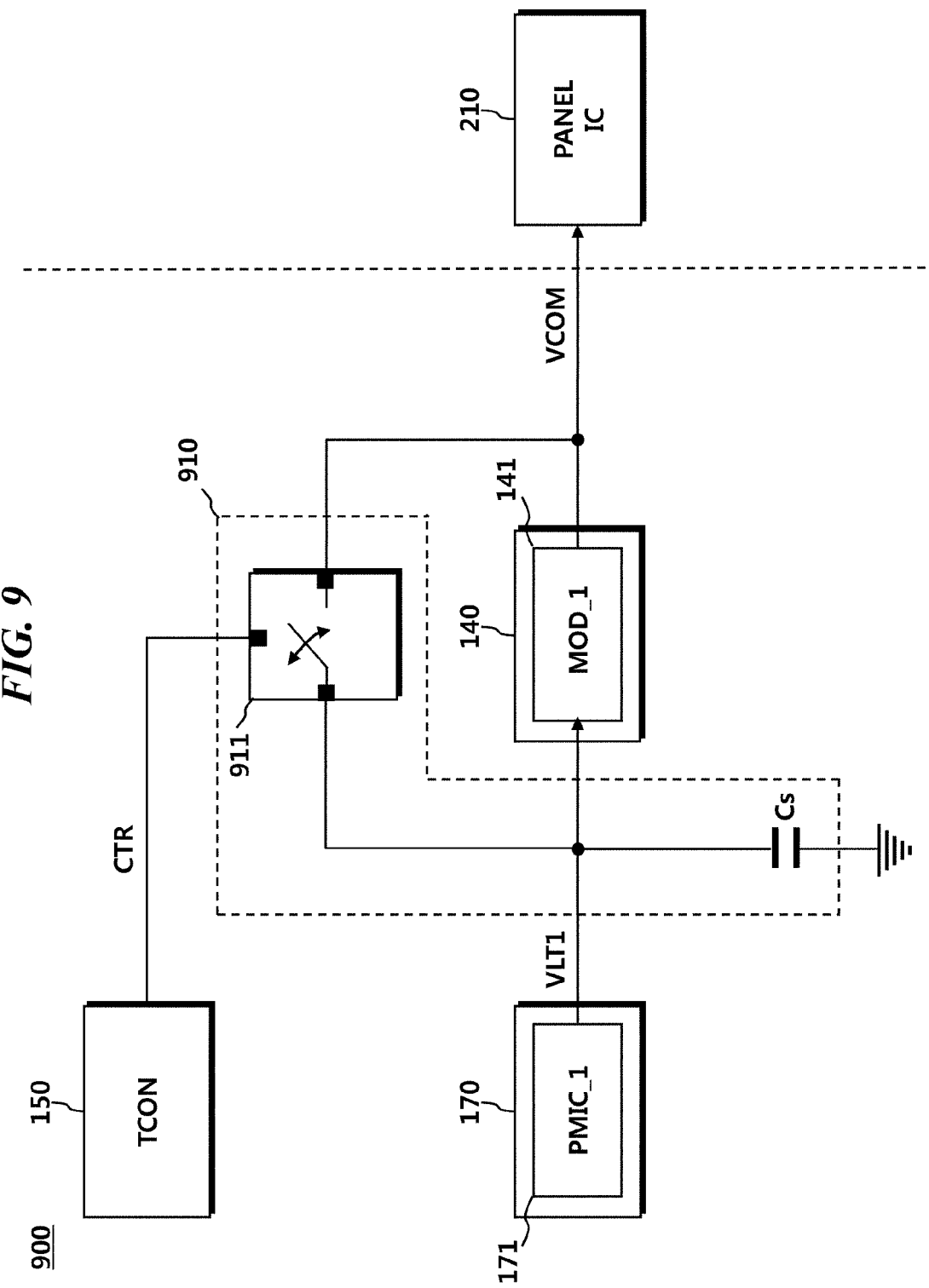
FIG. 9 is a diagram illustrating the configuration of a signal supply device including a signal stabilization circuit according to another embodiment of the present disclosure.

FIG. 9 is a diagram illustrating the configuration of a signal supply device including a signal stabilization circuit according to another embodiment of the present disclosure.

Referring to FIG. 9, a signal supply device 900 according to another embodiment is described. A switching circuit 911 of a signal stabilization circuit 910 may be disposed between the input end and the output end of the modulation IC 140. A first terminal of the switching circuit 911 is connected to the input end of the modulation IC 140 and a second terminal of the switching circuit 911 may be connected to the output end of the modulation IC 140. A capacitor (Cs), together with the first terminal of the switching IC 911, may be connected to the input end of the modulated IC 140.

If the modulation IC 140 produces and outputs a time-invariant DC voltage, the switching circuit 911 may connect the capacitor (Cs) to the output end of the modulation IC 140. If the modulation IC 140 produces and outputs a time-variant modulated voltage, the switching circuit 911 may disconnect the capacitor (Cs) from the output end of the modulation IC 140. Here, the time-invariant DC voltage may be produced in a display interval, and the time-variant modulated voltage may be produced in a touch interval. The switching circuit 911 may connect or disconnect the capacitor (Cs) to be appropriate for a timing of the display interval and the touch interval. A switching control signal (CTR) may determine the timing of a display interval and a touch interval, and the switching circuit 911 may receive the switching control signal (CTR) and may operate according to a time-division scheme. The switching control signal (CTR) may be produced from the timing controller 150, but is not limited thereto, and may be produced from a microcontroller, a power management IC, a source driver IC, a readout IC, or a source readout IC.

If the switching circuit 911 of the signal stabilization circuit 910 connects the capacitor (Cs) to the output end of the modulation IC 140, the switching circuit 911 may provide a bypass for a driving voltage that the power management IC 170 outputs. The driving voltage provided in a DC form may be directly input to the panel driving IC 210 via the switching circuit 911. Alternatively, a DC voltage produced by the modulation IC 140 may be input to the panel driving IC 210.

For example, in a display interval, the first power management IC 171 may supply a first driving voltage (VLT1) provided in a DC form to the modulation IC 140, the first modulation IC 141 may produce a time-invariant common voltage (VCOM), for example, a DC common voltage, from the first driving voltage (VLT1), and may supply the same to the panel driving IC 210. Alternatively, the first modulation IC 141 may use the first driving voltage (VLT1) as a time-invariant common voltage (VCOM). The switching circuit 911 may connect the capacitor (Cs) to the output end of the modulation IC 140 according to a switching control signal (CTR). The first driving voltage (VLT1) may flow to the panel driving IC 210 along with the switching circuit 911. The capacitor (Cs) may provide high capacitance and thus, may help in stably supplying the first driving voltage (VLT1) or a time-invariant common voltage (VCOM), for example, a DC common voltage, to the panel driving IC 210.

In a touch interval, the first power management IC 171 may supply a first driving voltage (VLT1) provided in a DC form to the modulation IC 140, the first modulation IC 141 may produce a time-variant common voltage (VCOM), for example, a modulated common voltage, from the first driving voltage (VLT1), and may supply the same to the panel driving IC 210. The switching circuit 911 may disconnect the capacitor (Cs) from the output end of the modulation IC 140 according to a switching control signal (CTR). The first driving voltage (VLT1) may not flow to the panel driving IC 210 along with the switching circuit 911. The switching circuit 911 may disconnect the capacitor (Cs), that is, remove capacitance, and may help in stably supplying a time-variant common voltage (VCOM), for example, a modulated common voltage, to the panel driving IC 210.

Figure 10:
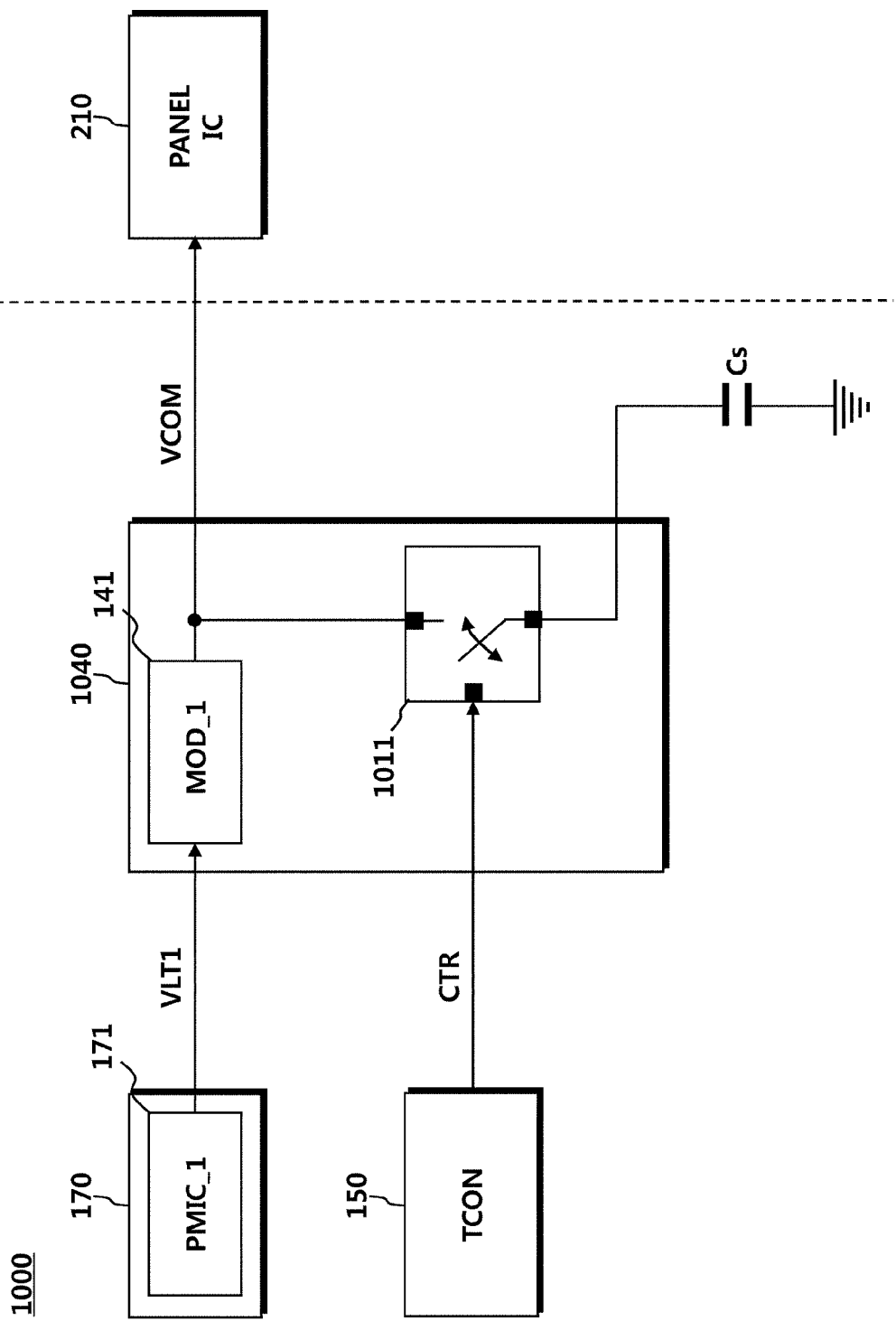
FIG. 10 is a diagram illustrating the configuration of a signal supply device including a signal stabilization circuit according to another embodiment of the present disclosure.

FIG. 10 is a diagram illustrating the configuration of a signal supply device including a signal stabilization circuit according to another embodiment of the present disclosure.

Referring to FIG. 10, a signal supply device 1000 according to another embodiment is described. A switching circuit 1011 of a signal stabilization circuit may be included in a modulation IC 1040. The switching circuit 1011 may be disposed inside the modulation IC 1040, but the switching circuit 1011 still may be connected to the output end of the modulation IC 1040.

Conversely, a capacitor (Cs) may be disposed outside the modulation IC 1040. However, the capacitor (Cs) still may be connected to the output end of the modulation IC 1040 via the switching circuit 1011. In the drawing, the capacitor (Cs) may be disposed outside the modulation IC 1040, but it is not limited thereto, and may be disposed inside the modulation IC 1040 according to a design.

A signal supply device 1000 according to another embodiment may also produce a time-invariant DC voltage or a time-variant modulated voltage, and may supply the same to the panel driving IC 210. For example, if the first power management IC 171 supplies a first driving voltage (VLT1) to the first modulation IC 141, the first modulation IC 141 may produce a common voltage (VCOM) from the first driving voltage (VLT1). Alternatively, the first modulation IC 141 may use the first driving voltage (VLT1) provided in a DC form as a common voltage (VCOM). Here, the first driving voltage (VLT1) may have a time-invariant DC voltage. The common voltage (VCOM) may have a time-invariant DC voltage or a time-variant modulated voltage. The first modulation IC 141 may produce a DC common voltage in a display interval, and may produce a modulated common voltage in a touch interval.

Figure 11:
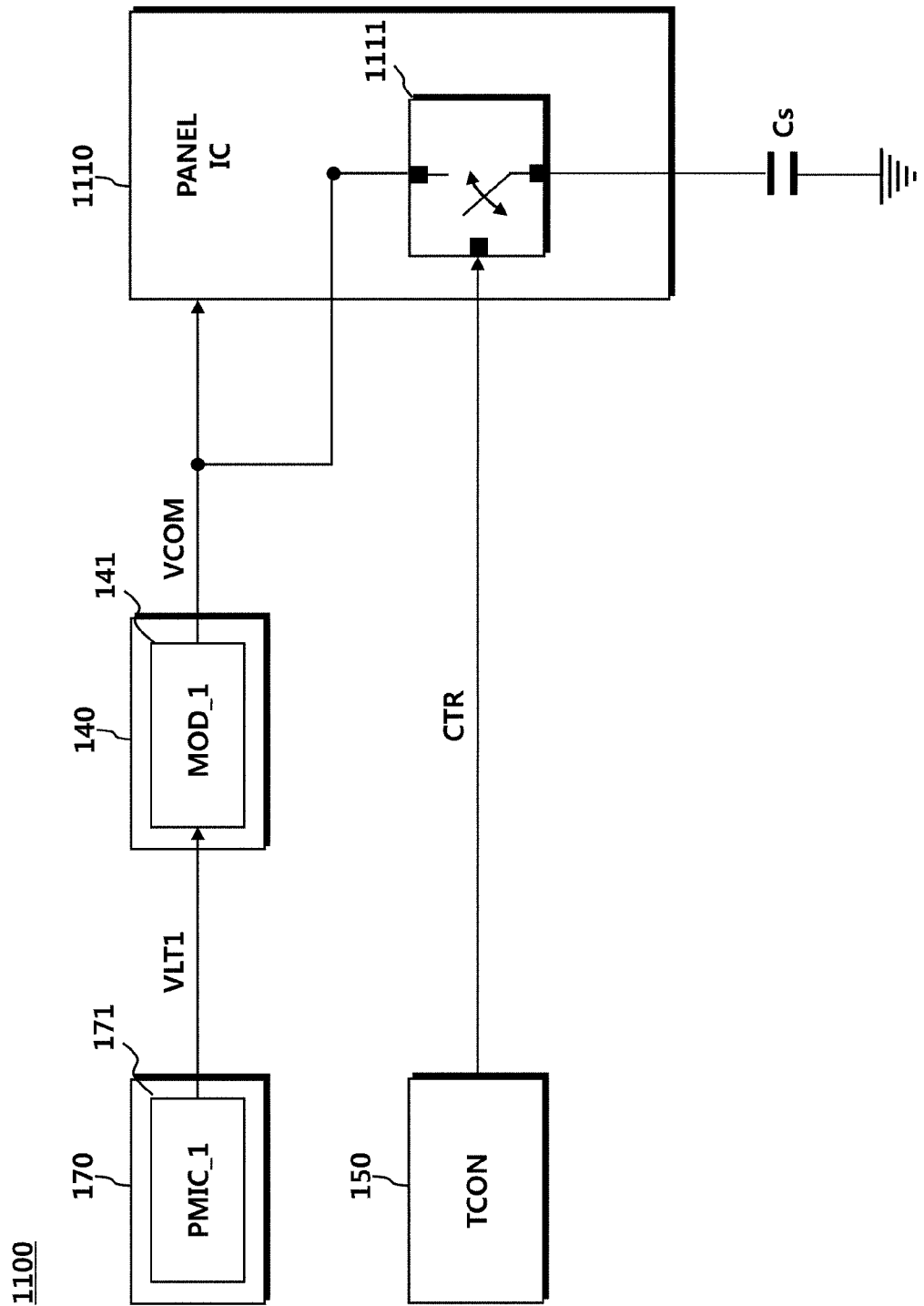
FIG. 11 is a diagram illustrating the configuration of a signal supply device including a signal stabilization circuit according to another embodiment of the present disclosure.

FIG. 11 is a diagram illustrating the configuration of a signal supply device including a signal stabilization circuit according to another embodiment of the present disclosure.

Referring to FIG. 11, a signal supply device 1100 according to another embodiment is described. A switching circuit 1111 of a signal stabilization circuit may be included in a panel driving IC 1110. The switching circuit 1111 may be disposed inside the panel driving IC 1110, but the switching circuit 1111 still may be connected to the output end of the modulation IC 140.

Conversely, a capacitor (Cs) may be disposed outside the panel driving IC 1110. However, the capacitor (Cs) still may be connected to the output end of the modulation IC 140 via the switching circuit 1111. In the drawing, the capacitor (Cs) may be disposed outside the panel driving IC 1110, but it is not limited thereto, and may be disposed inside the panel driving IC 1110 according to a design.

A signal supply device 1100 according to another embodiment may also produce a time-invariant DC voltage or a time-variant modulated voltage, and may supply the same to the panel driving IC 1110. For example, if the first power management IC 171 supplies a first driving voltage (VLT1) to the first modulation IC 141, the first modulation IC 141 may produce a common voltage (VCOM) from the first driving voltage (VLT1). Alternatively, the first modulation IC 141 may use the first driving voltage (VLT1) provided in a DC form as a common voltage (VCOM). Here, the first driving voltage (VLT1) may be a time-invariant DC voltage. The common voltage (VCOM) may be a time-invariant DC voltage or a time-variant modulated voltage. The first modulation IC 141 may produce a DC common voltage in a display interval, and may produce a modulated common voltage in a touch interval.

What is claimed is:

1. A display device comprising:
a modulation integrated circuit (IC) configured to receive a direct current (DC) voltage, and output the DC voltage or a modulated voltage having a plurality of levels;
a switching circuit disposed between an input end of the modulation IC and an output end of the modulation IC; and
a capacitive element configured to be connected to the input end of the modulation IC and configured to be disconnected from the output end of the modulation IC by controlling the switching circuit when the modulated voltage is output from the modulation IC.

2. The display device of claim 1, wherein the capacitive element is configured to be connected from the output end of the modulation IC by controlling the switching circuit when the DC voltage is output from the modulation IC.

3. The display device of claim 1, wherein a control signal for the switching circuit is received from a timing controller that outputs image data to a panel or from a microcontroller that senses a touch or proximity of an external object to the panel.

4. The display device of claim 2, wherein the switching circuit is configured to connect the capacitive element to the output end of the modulation IC in a first interval in which image data is output and is configured to disconnect the capacitive element from the output end of the modulation IC in a second interval in which a touch or proximity of an external object is sensed.

5. The display device of claim 1, wherein the DC voltage is supplied to a common electrode in order to output image data and the modulated voltage is supplied to the common electrode in order to sense a touch or proximity of an external object.

6. The display device of claim 5, wherein the common electrode comprises a first common electrode for receiving the modulated voltage and a second common electrode for receiving the modulated voltage and transmitting a response signal comprising information associated with sensing of the touch or proximity of the external object, and
wherein the modulated voltage is supplied as a zero load driving voltage to the first common electrode.

7. The display device of claim 6, wherein the modulated voltage is supplied to a gate line via a gate driving integrated circuit (IC) which scans a pixel in order to output image data.

8. The display device of claim 5, wherein the common electrode is connected to an integrator which senses a change in capacitance of the common electrode, and
wherein the modulated voltage is supplied to the common electrode via the integrator.

9. The display device of claim 5, wherein the common electrode is connected to an integrator which senses a change in capacitance of the common electrode, and
wherein the DC voltage is supplied to the common electrode by bypassing the integrator.

10. The display device of claim 1, further comprising a panel driving integrated circuit (IC) configured to drive a panel,
wherein the panel driving IC is configured to operate according to a time-division signal associated with a display interval in which image data is output to the panel and a touch interval in which a touch or proximity of an external object to the panel is sensed, and
wherein the modulation IC is configured to supply the DC voltage to the panel driving IC in the display interval and to supply the modulated voltage to the panel driving IC in the touch interval, according to the time-division signal.

11. A display device comprising:
a modulation integrated circuit (IC) configured to receive a direct current (DC) voltage and to output the DC voltage or a modulated voltage having a plurality of levels; and
a capacitive element connected to an input end of the modulation IC and configured to be additionally connected to an output end of the modulation IC if the DC voltage is output from the modulation IC and to be disconnected from the output end of the modulation IC if the modulated voltage is output from the modulation IC.

12. The display device of claim 11, further comprising a switching circuit disposed between the input end and the output end of the modulated IC and configured to control connection of the capacitive element according to a switching control signal that determines connection and disconnection between the capacitive element and the output end of the modulation IC.

13. The display device of claim 12, wherein the switching circuit is configured to connect the capacitive element to the output end of the modulation IC in a first interval in which image data is output and to disconnect the capacitive element therefrom in a second interval in which a touch or proximity of an external object is sensed.

14. The display device of claim 11, further comprising a power management integrated circuit (IC) configured to receive power supplied via a first terminal and to supply the DC voltage to the modulation IC via a second terminal.

* * * * *